(12) United States Patent
Limb

(10) Patent No.: US 11,159,560 B1
(45) Date of Patent: Oct. 26, 2021

(54) IDENTIFYING NETWORK APPLICATIONS USING IMAGES GENERATED FROM PAYLOAD DATA AND TIME DATA

(71) Applicant: BRAINTRACE, INC., Salt Lake City, UT (US)

(72) Inventor: John Franklin Limb, Herriman, UT (US)

(73) Assignee: BRAINTRACE, INC., Salt Lake City, UT (US)

( * ) Notice: Subject to any disclaimer, the term of this patent is extended or adjusted under 35 U.S.C. 154(b) by 0 days.

(21) Appl. No.: 17/208,567

(22) Filed: Mar. 22, 2021

Related U.S. Application Data

(60) Provisional application No. 63/005,909, filed on Apr. 6, 2020.

(51) Int. Cl.
| | | |
|---|---|---|
| *H04L 9/00* | (2006.01) | |
| *H04L 29/06* | (2006.01) | |
| *G06N 3/04* | (2006.01) | |
| *G06N 3/08* | (2006.01) | |

(52) U.S. Cl.
CPC ........... *H04L 63/1441* (2013.01); *G06N 3/04* (2013.01); *G06N 3/08* (2013.01); *H04L 63/1416* (2013.01)

(58) Field of Classification Search
CPC ... H04L 63/1416; H04L 63/1441; G06N 3/04; G06N 3/08
See application file for complete search history.

(56) References Cited

U.S. PATENT DOCUMENTS

| | | | |
|---|---|---|---|
| 9,717,093 B2* | 7/2017 | Wei | H04B 7/0608 |
| 2017/0222976 A1* | 8/2017 | Gross | H04L 63/1466 |
| 2019/0349392 A1* | 11/2019 | Wetterwald | H04J 3/0667 |
| 2020/0204569 A1* | 6/2020 | Komarek | G06K 9/6269 |
| 2020/0204571 A1* | 6/2020 | Neznal | H04L 63/1416 |
| 2020/0257602 A1* | 8/2020 | Crosby | G06N 3/0445 |
| 2020/0396233 A1* | 12/2020 | Luo | G06F 21/552 |
| 2021/0097168 A1* | 4/2021 | Patel | G06F 21/554 |

* cited by examiner

*Primary Examiner* — Beemnet W Dada
(74) *Attorney, Agent, or Firm* — ALG Intellectual Property, LLC

(57) ABSTRACT

Identifying network applications using images generated from payload data and time data. In some embodiments, a method may include training a convolutional neural network with training images generated from training payload data and training time data from flows of network packets, capturing target payload data and target time data from a target flow of network packets between a target client application and a target server application, generating a target image from the target payload data and the target time data, providing the target image as input to the trained convolutional neural network, and employing the trained convolutional neural network to determine an output including an extent to which the target image matches one of the training images in order to determine a likelihood that the target client application and/or the target server application matches one of the training client applications and/or one of the training server applications.

18 Claims, 7 Drawing Sheets

IDENTIFYING NETWORK APPLICATIONS USING IMAGES GENERATED FROM PAYLOAD DATA AND TIME DATA

CROSS-REFERENCE TO A RELATED APPLICATION

This application claims the benefit of, and priority to, U.S. Provisional Application No. 63/005,909, filed Apr. 6, 2020, which is incorporated herein by reference in its entirety for all that it discloses.

BACKGROUND

When a client application and a server application communicate with one another over a network, this communication is typically performed by each sending a series of network packets to one another. Each network packet generally includes two parts, a header and a payload. The header of a network packet generally includes routing information such as a source address and a destination address. The payload of a network packet generally includes data that is carried on behalf of a client application or a server application. While the header of a network packet is generally sent in an unencrypted format, the payload of a network packet is increasingly sent in an encrypted format.

When a client application and a server application are sending network packets between one another over a network, it is sometimes desirable to identify the client application and/or the server application. There are various reasons for identifying client and server applications. One such reason is to determine whether the client application and/or the server application is a malicious application so that actions can be taken to protect devices on the network, or the network itself, from the malicious application. Examples of functionality that may be present in malicious applications include functionality associated with a spyware, a virus, a worm, a logic bomb, a trapdoor, a Trojan horse, a Remote Admin Trojan (RAT), a malware, a mobile malicious code, a malicious font, and a rootkit, or some combination thereof.

Unfortunately, however, direct analysis of the client application and/or the server application is often not possible or convenient, and therefore techniques have been developed to identify the client application and/or the server application by analyzing the flow of network packets between the client application and the server application. One such technique is known as deep packet inspection (DPI). DPI is a type of data processing that inspects in detail network packets sent over a network. A network analysis device that employs DPI is often configured to examine payloads of network packets in a flow of network packets between a client application and a server application in order to identify the client application and/or the server application. As noted above, if the client application and/or the server application can be identified as a malicious application, actions can be taken to protect devices on the network, or the network itself, from the malicious application.

One problem with employing DPI to identify client applications and/or server applications based on flows of network packets is that an analysis using DPI can be burdensome in terms of time and resources. For example, attempting to analyze the payloads of network packets in a flow of network packets can take longer than is desired and can consume more memory and processing resources than desired, resulting in an unacceptably slow or burdensome identification of client applications and/or server applications.

Another problem with employing DPI to identify client applications and/or server applications based on flows of network packets is that DPI can be impossible where the payloads of the network packets in the flows of network packets are encrypted. For example, as the payloads of network packets are increasingly sent in an encrypted format (e.g., using TLS v1.3, for example), it is often impossible for a network analysis device that employs DPI to gain any access to the encrypted payloads in order to inspect that data in the payloads. As such, DPI can often not be used to identify a client application and/or a server application where the payloads of the network packets in the flow of network packet are encrypted.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for identifying network applications using images generated from payload data and time data may be performed, at least in part, by a computing device including one or more processors. The method may include training a convolutional neural network with training images generated from training payload data and training time data from flows of network packets between one or more training client applications and one or more training server applications. The method may also include capturing target payload data and target time data from a target flow of network packets between a target client application and a target server application. The target payload data may indicate lengths of payloads of the network packets in the target flow. The target time data may indicate time periods between arrivals of the network packets in the target flow. The method may further include generating a target image from the target payload data and the target time data. The method may also include providing the target image as input to the trained convolutional neural network. The method may further include employing the trained convolutional neural network to determine an output including an extent to which the target image matches one of the training images in order to determine a likelihood that the target client application and/or the target server application matches one of the training client applications and/or one of the training server applications.

In some embodiments, the training of the convolutional neural network may further include capturing the training payload data and the training time data from the training flows of network packets between the one or more training client application and one or more training server applications, generating each of the training images from the training payload data and the training time data for each of the training flows of network packets, and training a convolutional neural network with the training images.

In some embodiments, at least one of the training client applications and the training server applications is a malicious application. In these embodiments, the method may further include determining that the likelihood that the target client application and/or the target server application matches the malicious application is above a threshold match value, and in response, performing a remedial action. In these embodiments, the remedial action may include blocking one or more computing devices from executing the target client application and/or the target server application, blocking the one or more computing devices from communicating with the target client application and/or the target server application over a network, or alerting a user that the target client application and/or the target server application is likely a malicious application, or some combination thereof.

In some embodiments, the target image may include a grayscale image.

In some embodiments, the generating of each training images from the corresponding training payload data and training time data, and the generating of the target image from the target payload data and the target time data, may include normalizing the payload data, normalizing the time data, combining the normalized payload data with the normalized time data into a set of combined data points, placing the set of combined data points in a matrix beginning at a center of the matrix and spiraling outward from the center of the matrix, and converting the matrix into the image by converting each data point in the matrix into a pixel of the image.

In some embodiments, the normalizing of the payload data may include converting the lengths of the payloads of the network packets in the flow to positive Int32 length values, padding each of the positive Int32 length values to four digits, splitting each of the four digits into single-digit integers, and multiplying each of the single-digit integers by 28.3.

In some embodiments, the normalizing of the time data may include converting the time periods between the arrivals of the network packets in the flow to positive Float64 time period values, applying a Log Base 2 transformation to each of the positive Float64 time period values to generate first normalized time period values, normalizing the first normalized time period values to generate second normalized time period values between 0 and 999, padding each of the second normalized time period values to four digits, splitting each of the four digits into single-digit integers, and multiplying each of the single-digit integers by 28.3.

In some embodiments, the combining of the normalized payload data with the normalized time data into the set of combined data points may include interleaving the normalized payload data and the normalized time data into an array of the set of combined data points.

In some embodiments, the placing of the set of combined data points in the matrix may include placing the set of combined data points in the matrix beginning at the center of the matrix and spiraling outward in a clockwise direction from the center of the matrix.

In some embodiments, the placing of the set of combined data points in the matrix may include padding any remainder of the matrix with zeros.

Also, in some embodiments, one or more non-transitory computer-readable media may include one or more computer-readable instructions that, when executed by one or more computing devices, cause the one or more computing devices to perform a method for identifying network applications using images generated from payload data and time data.

Further, in some embodiments, a computing device may include one or more processors and one or more non-transitory computer-readable media that include one or more computer-readable instructions that, when executed by the one or more processors, cause the computing device to perform a method for identifying network applications using images generated from payload data and time data.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
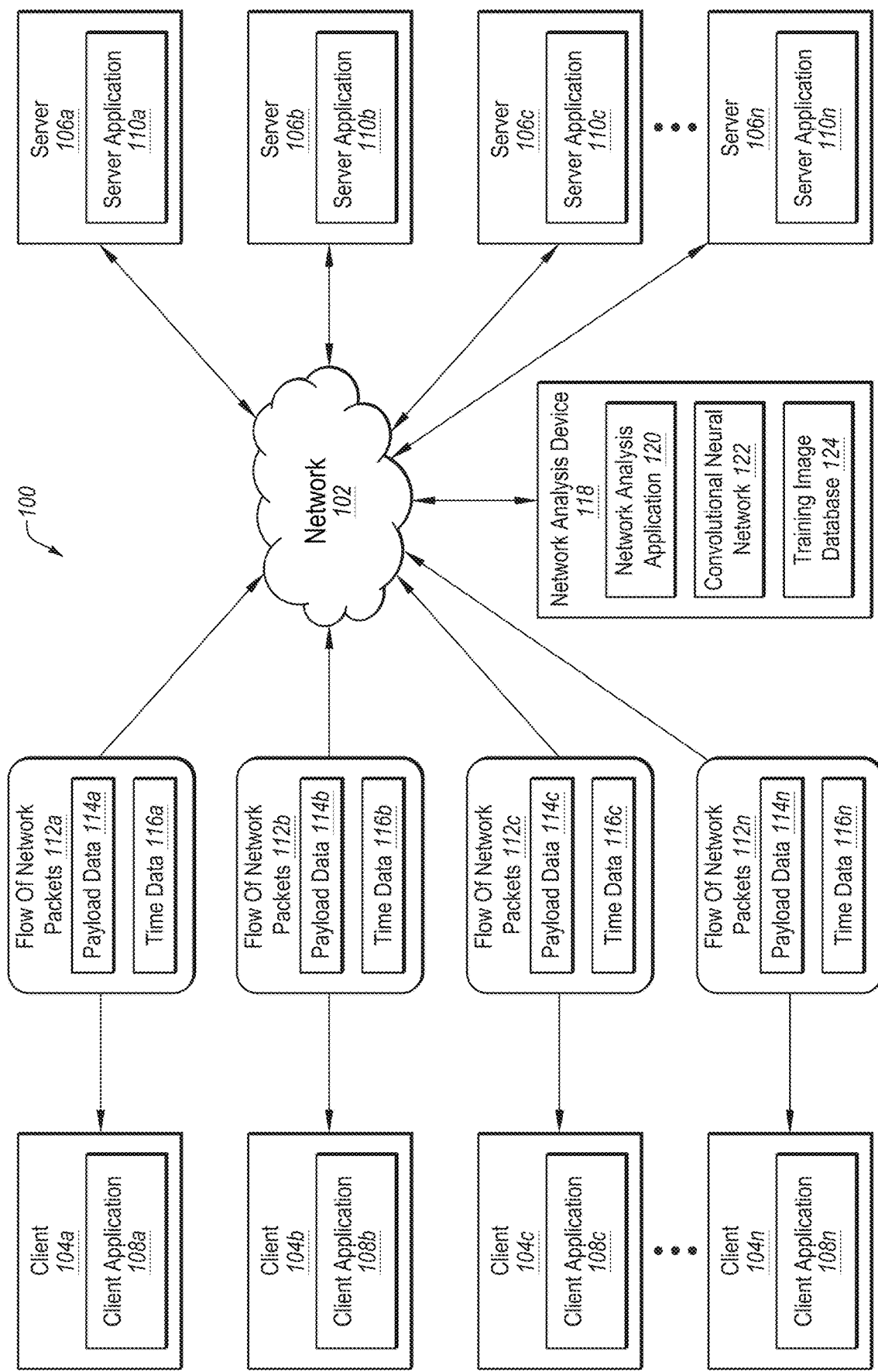
FIG. 1 illustrates an example system configured for identifying network applications using images generated from payload data and time data.

Conventional deep packet inspection (DPI) may be employed to identify a client application and/or a server application by analyzing a flow of network packets between the client application and the server application. For example, a network analysis device that employs conventional DPI is often configured to examine payloads of network packets in a flow of network packets between a client application and a server application in order to identify the client application and/or the server application. If the client application and/or the server application can be identified as a malicious application, actions can be taken to protect devices on the network, or the network itself, from the malicious application.

Unfortunately, problems exist with employing conventional DPI to identify client applications and/or server applications based on flows of network packets. One such problem is that an analysis using DPI can be burdensome in terms of time and resources because such an analysis can take longer than is desired and can consume more memory and processing resources than desired, resulting in an unacceptably slow or burdensome identification of client applications and/or server applications. Another such problem is that DPI can be impossible where the payloads of the network packets in the flows of network packets are encrypted. For example, as the payloads of network packets are increasingly sent in an encrypted format (e.g., using TLS v1.3, for example), it is often impossible for a network analysis device that employs DPI to gain any access to the encrypted payloads in order to inspect the data in the payloads.

The embodiments disclosed herein may provide various benefits. In particular, the embodiments disclosed herein may, for example, enable the identifying of network applications using images generated from payload data and time data. For example, employing methods disclosed herein, a convolutional neural network may be trained with training images generated from training payload data and training time data from flows of network packets between one or more training client applications and one or more training server applications. In some embodiments, the training client applications and/or training server applications may be known malicious applications, and thus the convolutional neural network may be trained to identify identical or similar malicious applications. Then, a network analysis application may capture target payload data and target time data from a target flow of network packets between a target client application and a target server application. The network analysis application may next generate a target image from the target payload data and the target time data and provide the target image as input to the trained convolutional neural network. The trained convolutional neural network may then determine an extent to which the target image matches one of the training images in order to determine a likelihood (e.g., between 0% and 100%) that the target client application and/or the target server application matches one of the training client applications and/or one of the training server applications. In embodiments where the training client applications and/or training server applications are malicious applications, the output of the trained convolutional neural network may indicate the likelihood (e.g., between 0% and 100%) that the target client application and/or target server application is also a malicious application, and actions can be taken to protect devices on the network, or the network itself, from the malicious application.

In some embodiments, the methods disclosed herein may enable client and server applications to be identified based on payload data and time data of flows of network packets, without employing conventional DPI. By not relying on the use of conventional DPI, the methods disclosed herein may identify client and server applications without the burden in terms of time and resources consumed by DPI. Further, by not relying on the use of conventional DPI, the methods disclosed herein may identify client and server applications even where the payloads of the network packets in the flows of network packets are encrypted (e.g., using TLS v1.3, for example), because payload data and time data for a flow of network packets is available even where the payloads of the network packets in the flow of network packets are encrypted. Accordingly, the methods disclosed herein may be superior, at least in some respects, to conventional DPI and may result in accurate identification of client and server applications in some circumstances (e.g., where payloads are encrypted) where conventional DPI may fail entirely.

Turning to the figures, FIG. 1 illustrates an example system 100 configured for identifying network applications using images generated from payload data and time data. The system 100 may include a network 102, clients 104a-104n, servers 106a-106n, and a network analysis device 118.

In some embodiments, the network 102 may be configured to communicatively couple the clients 104a-104n, the servers 106a-106n, and the network analysis device 118 to each other and to other network devices. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 5:
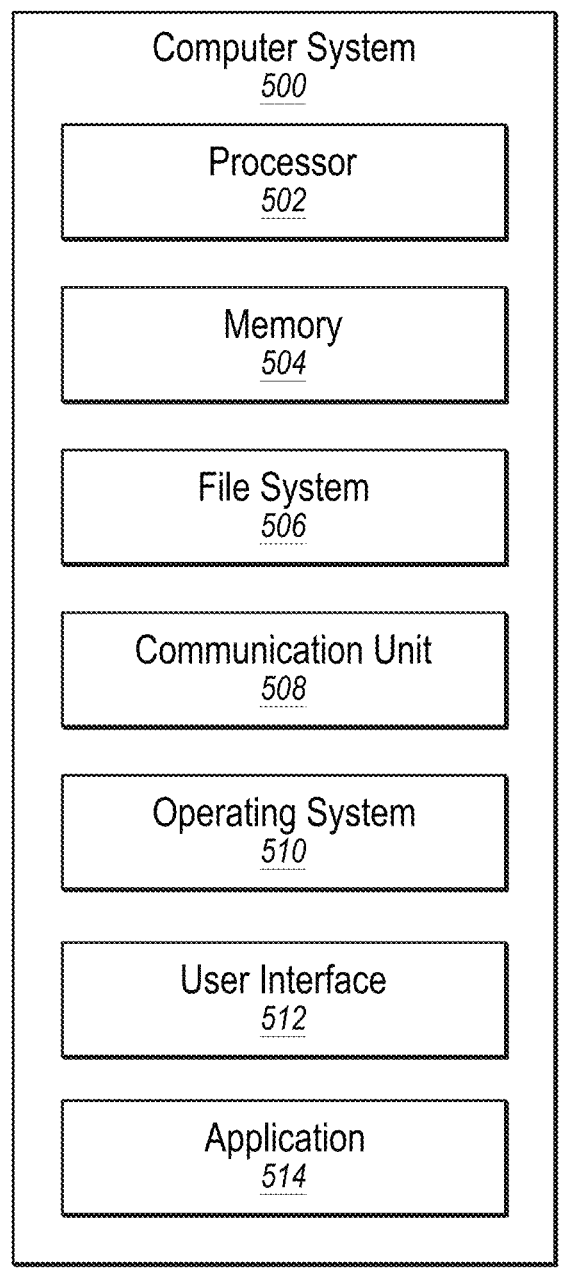
FIG. 5 illustrates an example computer system that may be employed in identifying network applications using images generated from payload data and time data.

In some embodiments, each of the clients 104a-104n may be any computer system capable of communicating over the network 102, examples of which are disclosed herein in connection with the computer system 500 of FIG. 5. The clients 104a-104n may include client applications 108a-108n, which may be known applications (e.g., known browsers, known ftp agents, etc.) or unknown applications (e.g., unknown malicious applications, etc.). In some embodiments, it is understood that each of the client applications 108a-108n may also function as a server application while communicating with another client application.

In some embodiments, each of the servers 106a-106n may be any computer system capable of communicating over the network 102, examples of which are disclosed herein in connection with the computer system 500 of FIG. 5. The servers 106a-106n may include server applications 110a-110n, which may be known applications (e.g., known web-server applications of known websites, known ftp server applications, etc.) or unknown applications (e.g., unknown malicious webservers, etc.), and each may be capable of communication with one or more client applications. In some embodiments, it is understood that each of the server applications 110a-110n may also function as a client application while communicating with another server application.

In some embodiments, one or more of the client applications 108a-108n and the server applications 110a-110n may be configured as a malicious application by including functionality of one or more of a spyware, a virus, a worm, a logic bomb, a trapdoor, a Trojan horse, a Remote Admin Trojan (RAT), a malware, a mobile malicious code, a malicious font, and a rootkit. When such a malicious application is executing without permission, the corresponding client or server may be considered to be "infected" with the malicious application.

In some embodiments, the network analysis device 118 may be any computer system capable of communicating over the network 102 and capable of monitoring flows of network packets between the clients 104a-104n and the servers 106a-106n over the network 102, examples of which are disclosed herein in connection with the computer system 500 of FIG. 5. In some embodiments, the network analysis device 118 may include a network analysis application 120 that may be configured to function in connection with a convolutional neural network 122.

More particularly, the network analysis application 120 may be configured to monitor flows of network packets 112a-112n between the clients 104a-104n and the servers 106a-106n in order to capture payload data 114a-114n and time data 116a-116n. The network analysis application 120 may also be configured to generate training images from payload data and time data for known client and server applications, and store the training images in the training image database 124. The network analysis application 120 may further be configured to employ these training images to train the convolutional neural network 122. The network analysis application 120 may also be configured to generate a target image from payload data and time data for an unknown client and server application, and then employ the convolutional neural network 122 to identify the extent to which unknown client and server applications match the known client and server applications (upon which the convolutional neural network 122 was trained). In this manner, the network analysis application 120 may employ the convolutional neural network 122 to identify unknown client and server applications from the flow of network packets between the unknown client and server applications.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
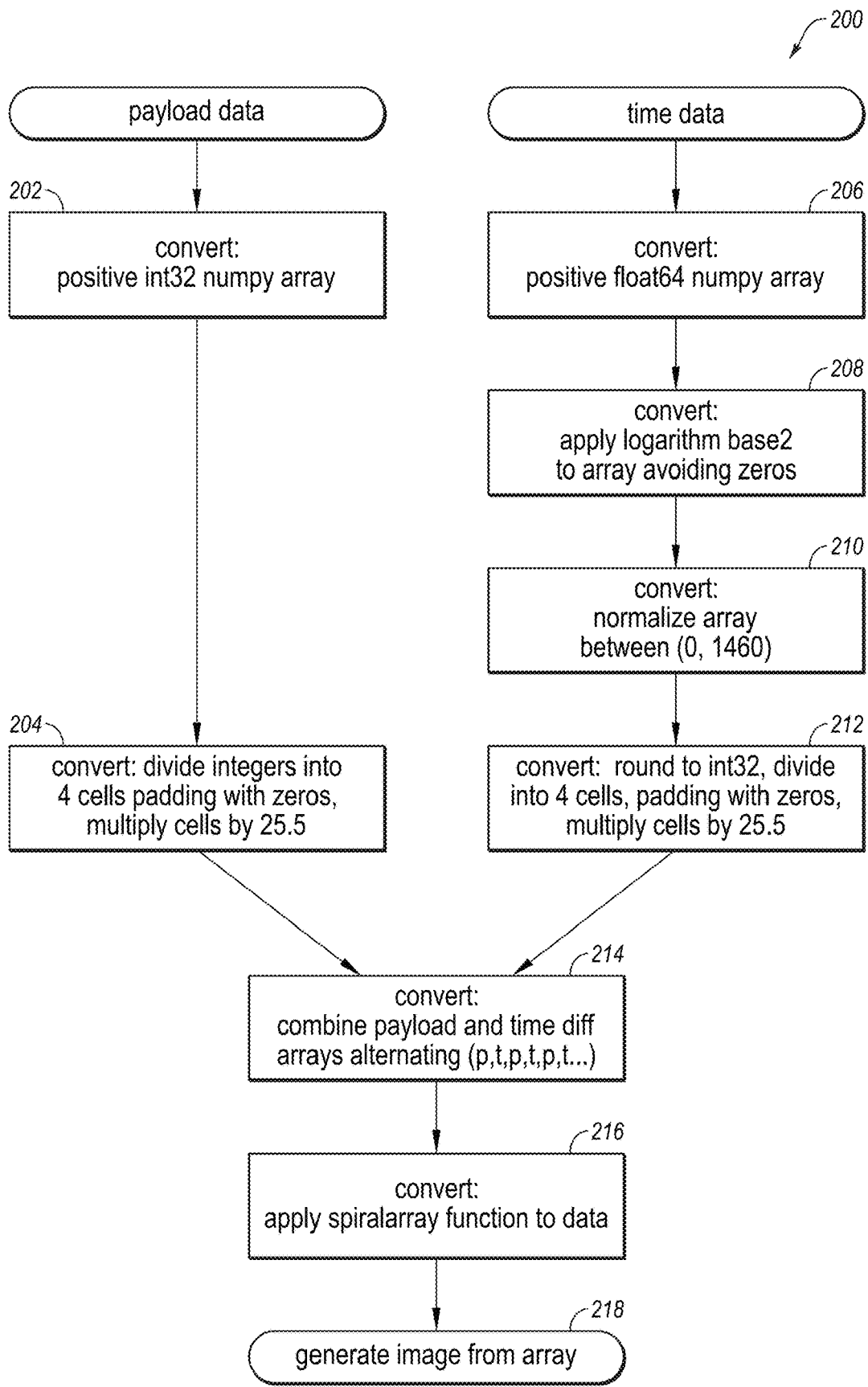
FIG. 2 is a flowchart of an example method for generating an image from payload data and time data.

FIG. 2 is a flowchart of an example method 200 for generating an image from payload data and time data. The method 200 may be performed, in some embodiments, by a device or application, such as by the network analysis application 120 executing on the network analysis device 118 of FIG. 1. In these and other embodiments, the method 200 may be performed by one or more processors based on one or more computer-readable instructions stored on one or more non-transitory computer-readable media. The method 200 will now be described in connection with FIGS. 1 and 2.

The method 200 may include, at actions 202 and 204, normalizing the payload data. More particularly, the method 200 may include, at action 202, converting the lengths of the payloads of the network packets in the flow to positive Int32 length values. Then, the method 200 may include, at action 204, padding each of the positive Int32 length values to four digits, splitting each of the four digits into single-digit integers, and multiplying each of the single-digit integers by 25.5.

The method 200 may include, at actions 206, 208, 210, and 212, normalizing the time data. More particularly, the method 200 may include, at action 206, converting the time periods between the arrivals of the network packets in the flow to positive Float64 time period values. Then, the method 200 may include, at action 208, applying a Log Base 2 transformation to each of the positive Float64 time period values to generate first normalized time period values. Next, the method 200 may include, at action 210, normalizing the first normalized time period values to generate second normalized time period values between 0 and 1460. Next, the method may include, at action 212, padding each of the second normalized time period values to four digits, splitting each of the four digits into single-digit integers, and multiplying each of the single-digit integers by 25.5.

The method 200 may include, at action 214, combining the normalized payload data with the normalized time data into a set of combined data points. In some embodiments, the combining of the normalized payload data with the normalized time data into the set of combined data points may include interleaving the normalized payload data and the normalized time data into an array of the set of combined data points. Then, the method 200 may include, at action 216, placing the set of combined data points in a matrix beginning at a center of the matrix and spiraling outward from the center of the matrix. In some embodiments, the placing of the set of combined data points in the matrix may include placing the set of combined data points in the matrix beginning at the center of the matrix and spiraling outward in a clockwise direction from the center of the matrix. In some embodiments, the placing of the set of combined data points in the matrix may include padding any remainder of the matrix with zeros. Next, the method 200 may include, at action 218, converting the matrix into the image by converting each data point in the matrix into a pixel of the image.

Although the actions of the method 200 are illustrated in FIG. 2 as discrete actions, various actions may be divided into additional actions, combined into fewer actions, reordered, expanded, or eliminated, depending on the desired implementation. For example, in some embodiments, the actions 202 and 204 for normalizing the payload data may be modified to some other form of normalization. In another example, in some embodiments, the actions 206, 208, 210, and 210 for normalizing the time data may be modified to some other form of normalization. In another example, in some embodiments, the action 210 may involve values between 0 and 999 (or some other range) instead of values between 0 and 1460, which may change the length of the time-diff from four digits to three digits, which may leave one digit used for padding before the normalized time value, thus increasing precision by giving more weight to the packet size values. In another example, in some embodiments, the action 212 may involve a multiplier of 28.3 (or some other multiplier) instead of a multiplier of 25.5, which may increase grayscale transform precision.

Figure 3A:
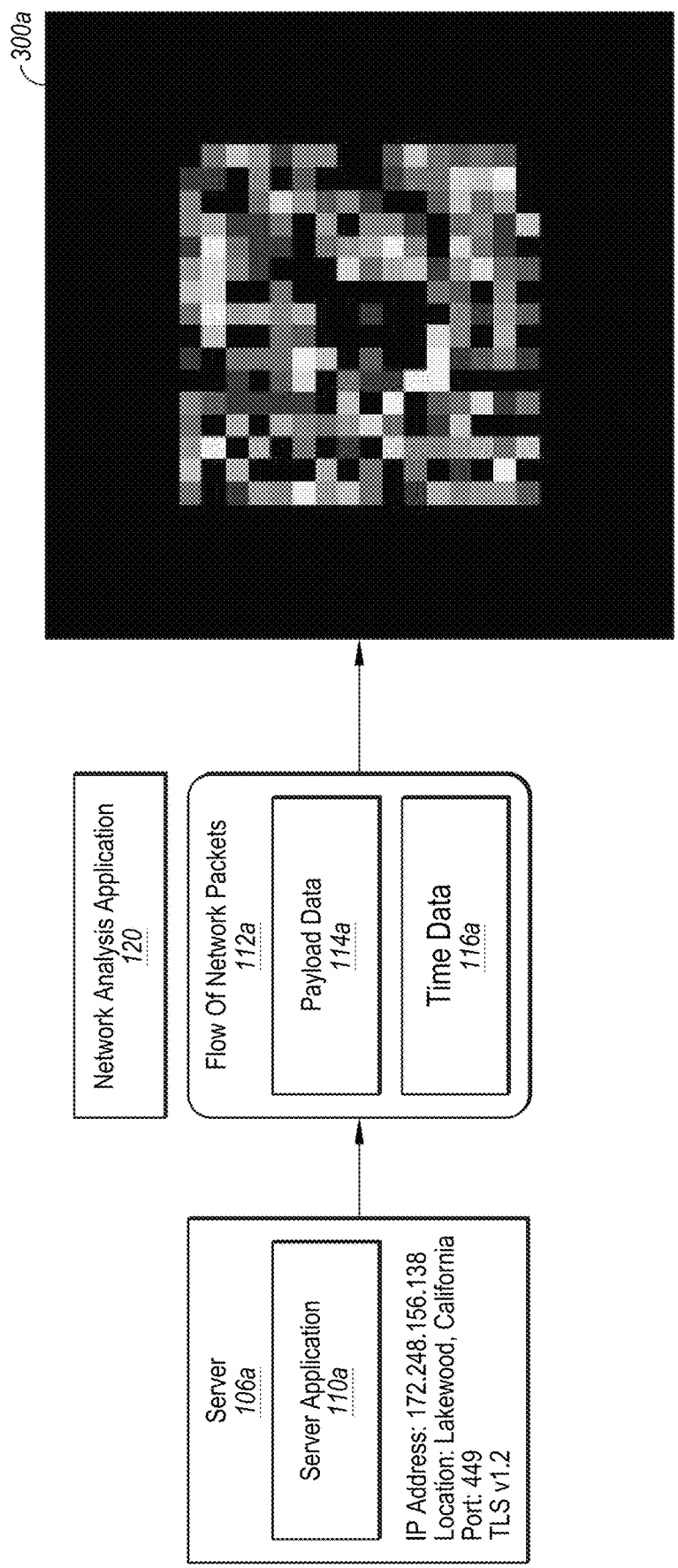
FIG. 3A illustrates a first image generated from payload data and time data from a flow of network packets between a client application and a first server application.

FIG. 3A illustrates a first image 300a generated from the payload data 114a and the time data 116a from the flow of network packets 112a between the client application 108a (see FIG. 1) and the server application 110a. For example, the first image 300a may be generated by the network analysis application 120 executing on the network analysis device 118 from the payload data 114a and the time data 116a from the flow of network packets 112a (e.g., that are intercepted or "sniffed" by the network analysis application 120) sent between the client application 108a executing on the client 104a and the server application 110a executing on the server 106a (see FIG. 1). As illustrated in FIG. 3A, the server 106a on which the server application 110a is executing may have an IP address of 172.248.156.138 and may have a location of Lakewood, Calif., while the flow of network packets 112a may be communicated over port 449 and may be formatted in the encrypted format of TLS v1.2. The generation of the image 300a will now be disclosed in connection with performance of the method 200 of FIG. 2.

Prior to the performance of the method 200, the payload data 114a and the time data 116a may be captured in the flow of network packets 112a (e.g., that are intercepted or "sniffed" by the network analysis application 120) that are sent between the client application 108a and the server application 110a. In this example, the payload data 114a in its raw state may be represented by the code: pay_raw=flow['payload_lengths'], and may have values as follows: [95, 0, −1382, −37, 0, 134, −59, 293, 0, −1382, −1382, −1382, −1382, 0, −1382, −1382, −1382, 0, −1382, −1382, 0, 0, −1382, −1382, 0, −1382, −1382, 0, −1382, −1382, 0, −1382]. Similarly, the time data 116a in its raw state may be represented by the code: time_raw=flow['timeval_diffs'], and may have values as follows: [0, 0, −10523, −21, 694, 23614, −96862, 2287, −169727, −51909, −105, −367, −19, 215, −49, −153, −104, 185, −95, −51, 15, 522, −9201, −70450, 522, −69507, −11202, 656, −4695, −9910, 603, −8501]. In these examples, the values of the payload data 114a may indicate lengths (e.g., in bytes) of payloads of the network packets in the flow of network packets 112a, while the values of the time data 116a may indicate time periods (e.g., in nanoseconds) between arrivals of the network packets in the flow of network packets 112a. Further, in these examples, positive values may represent network packets sent from the client application to the server application, while negative values may represent network packets sent from the server application to the client application. Also, in these examples, there may be some padding at the beginning or the end of the payload data 114 and/or the time data 116a (e.g., such as the padding represented by the first two zeros at the beginning of the time data 116a).

At action 202, the network analysis application 120 may convert the lengths of the payloads of the network packets in the flow to positive Int32 length values. This action may be represented by the code: payzero=np.abs(np.asarray(pay_raw, dtype='int32')), and may result in values as follows: [127 0 1382 37 0 134 59 389 1354 0 1354 1354 1354 0 1354 1354 233 0 0 0 789 0 389 1354 1354 1354 1354 1354 1354 233 0 0].

At action 204, the network analysis application 120 may pad each of the positive Int32 length values to four digits, split each of the four digits into single-digit integers, and multiply each of the single-digit integers by 25.5. This action may be represented by the code: payloadse=[int(25.5*int(x)) for n in payzero for x in str(n).zfill(4)], and may result in values as follows: [0, 25, 51, 178, 0, 0, 0, 0, 25, 76, 204, 51, 0, 0, 76, 178, 0, 0, 0, 0, 0, 25, 76, 102, 0, 0, 127, 229, 0, 76, 204, 229, 25, 76, 127, 102, 0, 0, 0, 0, 25, 76, 127, 102, 25, 76, 127, 102, 25, 76, 127, 102, 0, 0, 0, 0, 25, 76, 127, 102, 25, 76, 127, 102, 0, 51, 76, 76, 0, 0, 0, 0, 0, 0, 0, 0, 0, 0, 0, 0, 178, 204, 229, 0, 0, 0, 0, 0, 76, 204, 229, 25, 76, 127, 102, 25, 76, 127, 102, 25, 76, 127, 102, 25, 76, 127, 102, 25, 76, 127, 102, 25, 76, 127, 102, 0, 51, 76, 76, 0, 0, 0, 0, 0, 0, 0].

At action 206, the network analysis application 120 may convert the time periods between the arrivals of the network packets in the flow to positive Float64 time period values. This action may be represented by the code: timezero=np.abs(np.asarray(time_raw, dtype='float64')), and may result in values as follows: [0.00000e+00 0.00000e+00 2.74600e+03 6.90000e+01 5.85000e+02 2.32410e+04 1.79643e+05 2.55900e+03 4.70000e+01 1.71964e+05 6.52000e+02 3.90000e+01 1.20000e+01 1.84557e+05 6.40000e+02 3.70000e+01 1.20000e+01 5.27930e+04 1.16186e+05 5.00000e+00 4.90000e+02 4.27740e+05 2.14454e+05 7.96707e+05 3.07000e+02 2.50000e+01 9.00000e+00 7.00000e+00 7.00000e+00 8.00000e+00 8.00000e+00 2.03697e+05 5.94800e+03].

At action 208, the network analysis application 120 may apply a Log Base 2 transformation to each of the positive Float64 time period values to generate first normalized time period values. This action may be represented by the code: p.log 2(timezero, out=timezero), and may result in values as follows: [0. 0. 11.4236412 6.12928302 9.19475685 14.5044466 17.45478123 11.32192809 5.5849625 17.39175544 9.35093918 5.32192809 3.70043972 17.49371475 9.32418055 5.24792751 3.70043972 15.68808636 16.82608913 2.5849625 8.93957921 18.70637797 17.71031543 19.60369154 8.26678654 4.70043972 3.32192809 3. 3. 3.169925 3.169925 17.63607229 12.53843146].

At action 210, the network analysis application 120 may normalize the first normalized time period values to generate second normalized time period values between 0 and 1460. This action may be represented by the code: preprocessing.minmax_scale(timezero, feature_range=(0, 1460), axis=0, copy=False), and may result in values as follows: [0. 0. 850.74541898 454.93709765 684.60313835 1080.2252894 1299.95777434 843.16739871 413.68231375 1295.26385321 696.25378164 393.63443044 266.9928633 1302.85739468 694.25782643 387.97808068 266.9928633 1168.3803664 1253.13511624 172.92739612 665.56304318 1393.17176005 1318.98897933 1460. 615.32592299 345.85479224 236.08262358 209.07993565 209.07993565 223.42732727 223.42732727 1313.45963763 933.79134731].

At action 212, the network analysis application 120 may pad each of the second normalized time period values to four digits, split each of the four digits into single-digit integers, and multiply each of the single-digit integers by 25.5. This action may be represented by the code: timediff=[round (25.5*int(x)) for n in timezero for x in str(int(n)).zfill(4)], and may result in values as follows: [0, 0, 0, 0, 0, 0, 0, 0, 0, 204, 128, 0, 0, 102, 128, 102, 0, 153, 204, 102, 26, 0, 204, 0, 26, 51, 230, 230, 0, 204, 102, 76, 0, 102, 26, 76, 26, 51, 230, 128, 0, 153, 230, 153, 0, 76, 230, 76, 0, 51, 153, 153, 26, 76, 0, 51, 0, 153, 230, 102, 0, 76, 204, 178, 0, 51, 153, 153, 26, 26, 153, 204, 26, 51, 128, 76, 0, 26, 178, 51, 0, 153, 153, 128, 26, 76, 230, 76, 26, 76, 26, 204, 26, 102, 153, 0, 0, 153, 26, 128, 0, 76, 102, 128, 0, 51, 76, 153, 0, 51, 0, 230, 0, 51, 0, 230, 0, 51, 51, 76, 0, 51, 51, 76, 26, 76, 26, 76, 0, 230, 76, 76].

At action 214, the network analysis application 120 may combine the normalized payload data with the normalized time data into a set of combined data points. This action may be represented by the code: combine=list(itertools.chain.from_iterable(zip(payloadse, timediff))), and may result in values as follows: [0, 0, 25, 0, 51, 0, 178, 0, 0, 0, 0, 0, 0, 0, 0, 0, 25, 0, 76, 204, 204, 128, 51, 0, 0, 0, 0, 102, 76, 128, 178, 102, 0, 0, 0, 153, 0, 204, 0, 102, 0, 26, 25, 0, 76, 204, 102, 0, 0, 26, 0, 51, 127, 230, 229, 230, 0, 0, 76, 204, 204, 102, 229, 76, 25, 0, 76, 102, 127, 26, 102, 76, 0, 26, 0, 51, 0, 230, 0, 128, 25, 0, 76, 153, 127, 230, 102, 153, 25, 0, 76, 76, 127, 230, 102, 76, 25, 0, 76, 51, 127, 153, 102, 153, 0, 26, 0, 76, 0, 0, 0, 51, 25, 0, 76, 153, 127, 230, 102, 102, 25, 0, 76, 76, 127, 204, 102, 178, 0, 0, 51, 51, 76, 153, 76, 153, 0, 26, 0, 26, 0, 153, 0, 204, 0, 26, 0, 51, 0, 128, 0, 76, 0, 0, 0, 26, 0, 178, 0, 51, 0, 0, 178, 153, 204, 153, 229, 128, 0, 26, 0, 76, 0, 230, 0, 76, 0, 26, 76, 76, 204, 26, 229, 204, 25, 26, 76, 102, 127, 153, 102, 0, 25, 0, 76, 153, 127, 26, 102, 128, 25, 0, 76, 76, 127, 102, 102, 128, 25, 0, 76, 51, 127, 76, 102, 153, 25, 0, 76, 51, 127, 0, 102, 230, 25, 0, 76, 51, 127, 0, 102, 230, 0, 0, 51, 51, 76, 51, 76, 76, 0, 0, 0, 51, 0, 51, 0, 76, 0, 26, 0, 76, 0, 26, 0, 76].

At action 216, the network analysis application 120 may place the set of combined data points in a matrix beginning at a center of the matrix and spiraling outward from the center of the matrix. This action may be represented by the code: spiral=SpiralArray(combine), with SpiralArray being defined as follows:

```
class SpiralArray:
    N, S, W, E = (0, -1), (0, 1), (-1, 0), (1, 0)
    turn = {N: E, E: S, S: W, W: N}
    def __init__(self, array):
        self.width = 28 # math.ceil(math.sqrt(len(array)))   // note, in some embodiments,
                                                             // self.width = 16, which may remove
                                                             // unnecessary padding to increase
                                                             // efficiency of the prediction model
```

```
    self.array = np.asarray([np.asarray([None] * self.width) for _ in range(self.width)])
    self.__fill(array)
def __fill(self, array):
    # if len(array) < self.width ** 2:
    #     array.extend([0] * (self.width ** 2 - len(array)))
    array_len = len(array)
    x = y = self.width // 2 - ((self.width - 1) % 2)
    dx, dy = self.N # initial direction
    count = -1
    while True:
        count += 1
        self.array[y][x] = array[count] if count < array_len else 0
        # try to turn right
        new_dx, new_dy = self.turn[dx, dy]
        new_x, new_y = x +new_dx, y + new_dy
        if (0 <= new_x < self.width and 0 <= new_y < self.width and
                self.array[new_y][new_x] is None):
            x, y = new_x, new_y
            dx, dy = new_dx, new_dy
        else: # try to move straight
            x, y = x + dx, y + dy
            if not (0 <= x < self.width and 0 <= y < self.width):
                Return
```

This action may result in a matrix with values as follows:
[[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 76 51 127 76 102 153 25 0 76 51 127 0 102 230 25 0 0 0 0 0 0]
[0 0 0 0 0 0 0 178 0 51 0 0 178 153 204 153 229 128 0 26 76 0 0 0 0 0]
[0 0 0 0 0 25 26 0 51 25 0 76 153 127 230 102 102 25 0 0 51 0 0 0 0 0]
[0 0 0 0 0 128 0 0 26 0 51 0 230 0 128 25 0 76 76 127 0 0 0 0 0 0]
[0 0 0 0 0 102 0 0 76 25 0 76 204 102 0 0 26 76 76 0 0 0 0 0 0 0]
[0 0 0 0 0 102 0 76 102 26 204 128 51 0 0 0 0 153 127 230 102 0 0 0 0 0]
[0 0 0 0 0 127 76 0 26 0 204 178 0 0 0 0 51 127 204 0 230 0 0 0 0 0]
[0 0 0 0 0 76 0 26 127 102 76 0 0 0 0 102 127 230 102 76 0 0 0 0 0 0]
[0 0 0 0 0 76 128 0 102 0 0 51 0 25 0 76 230 102 178 0 0 0 0 0 0 0]
[0 0 0 0 0 0 0 153 76 204 25 0 0 0 128 229 153 0 26 51 0 0 0 0 0 0]
[0 0 0 0 0 25 51 102 0 0 153 0 0 0 102 178 230 25 0 76 51 0 0 0 0 0]
[0 0 0 0 0 128 0 153 25 76 229 102 204 204 76 0 0 0 51 76 76 0 0 0 0 0]
[0 0 0 0 0 102 26 127 51 76 0 25 76 102 230 127 76 76 51 204 51 0 0 0 0 0]
[0 0 0 0 0 0 26 0 204 0 153 0 26 0 26 0 153 76 153 76 26 76 0 0 0 0 0]
[0 0 0 0 0 127 153 76 0 25 0 102 153 127 102 76 26 25 204 229 76 0 0 0 0 0]
[0 0 0 0 0 76 0 26 0 76 0 26 0 76 0 51 0 51 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0]]

At action 218, the network analysis application 120 may convert the matrix into the image 300a by converting each data point in the matrix into a pixel of the image 300a.

Therefore, in this first example, the image 300a of FIG. 3A may be generated from the payload data 114a and the time data 116a. Then, in a situation where the server application 110a is a known malicious application (e.g., a known malicious webserver application), the image 300a may be employed to train the convolutional neural network 122 so that the convolutional neural network 122 can later be employed to recognize other applications that match (e.g., above a certain threshold such as 90%) the malicious application.

Figure 3B:
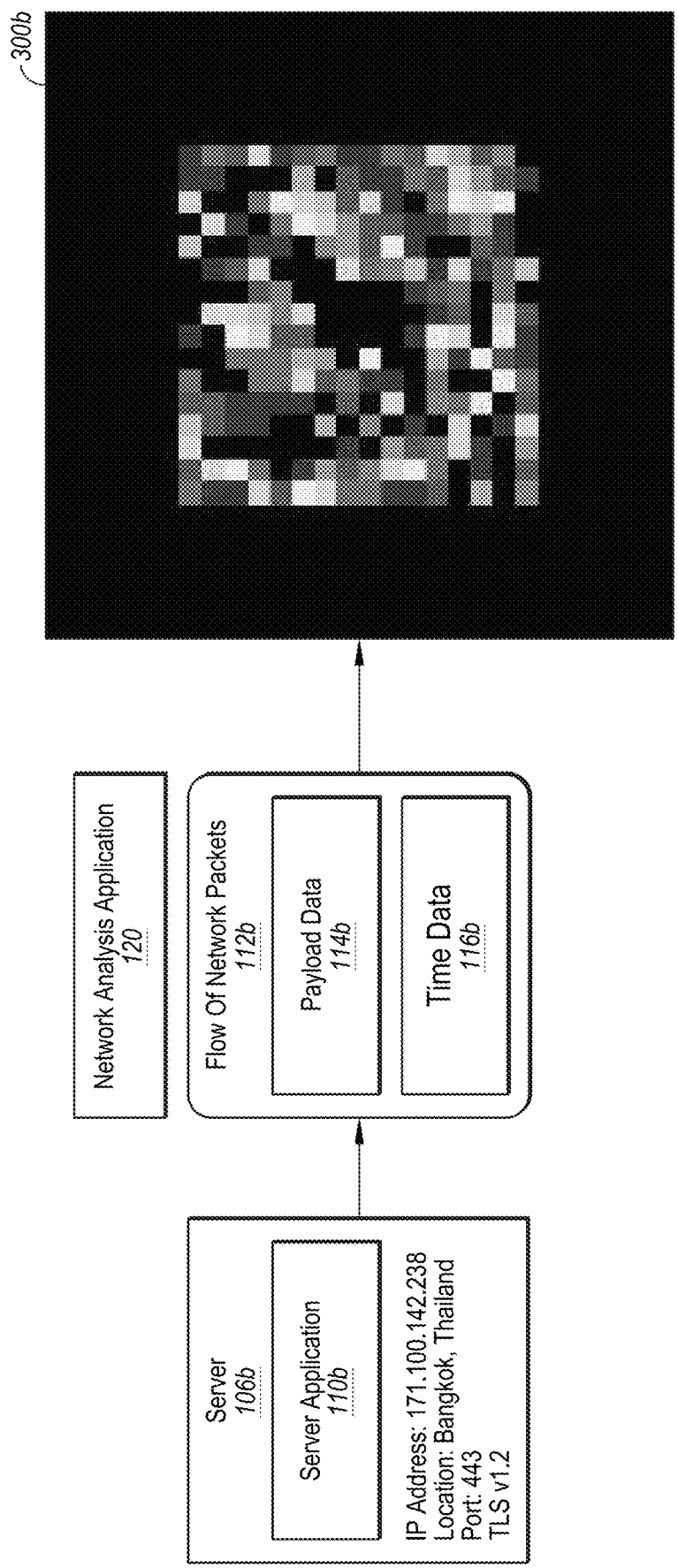
FIG. 3B illustrates a second image generated from payload data and time data from a flow of network packets between a client application and a second server application.

FIG. 3B illustrates a second image 300b generated from the payload data 114b and the time data 116b from the flow of network packets 112b between the client application 108b (see FIG. 1) and the server application 110b. For example, the second image 300b may be generated by the network analysis application 120 executing on the network analysis device 118 from the payload data 114b and the time data 116b from the flow of network packets 112b (e.g., that are intercepted or "sniffed" by the network analysis application 120) that are sent between the client application 108b executing on the client 104b and the server application 110b executing on the server 106b (see FIG. 1). As illustrated in FIG. 3B, the server 106b on which the server application 110b is executing may have an IP address of 171.100.142.238 and may have a location of Bangkok, Thailand, while the flow of network packets 112b may be communicated over port 443 and be formatted in the encrypted format of TLS v1.2. The generation of the image 300b will now be disclosed in connection with performance of the method 200 of FIG. 2. However, the actions of the method 200, and the code representations of the actions of the method 200 that are disclosed in connection with FIG. 3A, will not be repeated in this disclosure of FIG. 3B, although it is understand that the same code or different code may be employed in the generation of the image 300b.

Prior to the performance of the method 200, the payload data 114b in its raw state may have values as follows: [95, 0, −1382, −37, 0, 134, −59, 293, 0, −1382, −1382, −1382, −1382, 0, −1382, −1382, −1382, 0, −1382, −1382, 0, 0, −1382, −1382, 0, −1382, −1382, 0, −1382, −1382, 0, −1382].

Similarly, the time data 116b in its raw state may have values as follows: [0, 0, −10523, −21, 694, 23614, −96862, 2287, −169727, −51909, −105, −367, −19, 215, −49, −153, −104, 185, −95, −51, 15, 522, −9201, −70450, 522, −69507, −11202, 656, −4695, −9910, 603, −8501].

The action 202 may result in values as follows: [95 0 1382 37 0 134 59 293 0 1382 1382 1382 1382 0 1382 1382 1382 0 1382 1382 0 0 1382 1382 0 1382 1382 0 1382 1382 0 1382].

The action 204 may result in values as follows: [0, 0, 229, 127, 0, 0, 0, 0, 25, 76, 204, 51, 0, 0, 76, 178, 0, 0, 0, 0, 0, 25, 76, 102, 0, 0, 127, 229, 0, 51, 229, 76, 0, 0, 0, 0, 25, 76, 204, 51, 25, 76, 204, 51, 25, 76, 204, 51, 25, 76, 204, 51, 0, 0, 0, 0, 25, 76, 204, 51, 25, 76, 204, 51, 25, 76, 204, 51, 0, 0, 0, 0, 25, 76, 204, 51, 25, 76, 204, 51, 0, 0, 0, 0, 0, 0, 0, 25, 76, 204, 51, 25, 76, 204, 51, 0, 0, 0, 0, 25, 76, 204, 51, 25, 76, 204, 51, 0, 0, 0, 0, 25, 76, 204, 51, 25, 76, 204, 51, 0, 0, 0, 0, 25, 76, 204, 51].

The action 206 may result in values as follows: [0.00000e+00 0.00000e+00 1.05230e+04 2.10000e+01 6.94000e+02 2.36140e+04 9.68620e+04 2.28700e+03 1.69727e+05 5.19090e+04 1.05000e+02 3.67000e+02 1.90000e+01 2.15000e+02 4.90000e+01 1.53000e+02 1.04000e+02 1.85000e+02 9.50000e+01 5.10000e+01 1.50000e+01 5.22000e+02 9.20100e+03 7.04500e+04 5.22000e+02 6.95070e+04 1.12020e+04 6.56000e+02 4.69500e+03 9.91000e+03 6.03000e+02 8.50100e+03].

The action 208 may result in values as follows: [0. 0. 13.36125844 4.39231742 9.43879185 14.52735482 16.56364317 11.15924065 17.37285656 15.66369707 6.71424552 8.51963625 4.24792751 7.74819285 5.61470984 7.25738784 6.70043972 7.53138146 6.56985561 5.67242534 3.9068906 9.027906 13.16757495 16.10431209 9.027906 16.08487066 13.45146871 9.357552 12.19690944 13.27466934 9.23601419 13.05341684].

The action 210 may result in values as follows: [0. 0. 1122.86872661 369.12659787 793.22799087 1220.86646868 1391.99439924 937.81303571 1460. 1316.36369932 564.25944817 715.98294075 356.99219344 651.15149724 471.855411 609.90466442 563.0992206 632.93085362 552.12504374 476.70577206 328.33174267 758.69749511 1106.59173196 1353.39260785 758.69749511 1351.75876683 1130.44992072 786.40066356 1025.01783311 1115.59185287 776.18672977 1096.99798231].

The action 212 may result in values as follows: [0, 0, 0, 0, 0, 0, 0, 0, 26, 26, 51, 51, 0, 76, 153, 230, 0, 178, 230, 76, 26, 51, 51, 0, 26, 76, 230, 26, 0, 230, 76, 178, 26, 102, 153, 0, 26, 76, 26, 153, 0, 128, 153, 102, 0, 178, 26, 128, 0, 76, 128, 153, 0, 153, 128, 26, 0, 102, 178, 26, 0, 153, 0, 230, 0, 128, 153, 76, 0, 153, 76, 51, 0, 128, 128, 51, 0, 102, 178, 153, 0, 76, 51, 204, 0, 178, 128, 204, 26, 26, 0, 153, 26, 76, 128, 76, 0, 178, 128, 204, 26, 76, 128, 26, 26, 26, 76, 0, 0, 178, 204, 153, 26, 0, 51, 128, 26, 26, 26, 128, 0, 178, 178, 153, 26, 0, 230, 153].

The action 214 may result in values as follows: [0, 0, 0, 0, 229, 0, 127, 0, 0, 0, 0, 0, 0, 0, 25, 26, 76, 26, 204, 51, 51, 51, 0, 0, 0, 76, 76, 153, 178, 230, 0, 0, 0, 178, 0, 230, 0, 76, 0, 26, 25, 51, 76, 51, 102, 0, 0, 26, 0, 76, 127, 230, 229, 26, 0, 0, 51, 230, 229, 76, 76, 178, 0, 26, 0, 102, 0, 153, 0, 0, 25, 26, 76, 76, 204, 26, 51, 153, 25, 0, 76, 128, 204, 153, 51, 102, 25, 0, 76, 178, 204, 26, 51, 128, 25, 0, 76, 76, 204, 128, 51, 153, 0, 0, 0, 153, 0, 128, 0, 26, 25, 0, 76, 102, 204, 178, 51, 26, 25, 0, 76, 153, 204, 0, 51, 230, 25, 0, 76, 128, 204, 153, 51, 76, 0, 0, 0, 153, 0, 76, 0, 51, 25, 0, 76, 128, 204, 128, 51, 51, 25, 0, 76, 102, 204, 178, 51, 153, 0, 0, 76, 0, 51, 0, 204, 0, 0, 0, 178, 0, 128, 0, 204, 25, 26, 76, 26, 204, 0, 51, 153, 25, 26, 76, 76, 204, 128, 51, 76, 0, 0, 0, 178, 0, 128, 0, 204, 25, 26, 76, 76, 204, 128, 51, 26, 25, 26, 76, 26, 204, 76, 51, 0, 0, 0, 0, 178, 0, 204, 0, 153, 25, 26, 76, 0, 204, 51, 51, 128, 25, 26, 76, 26, 204, 26, 51, 128, 0, 0, 0, 178, 0, 178, 0, 153, 25, 26, 76, 0, 204, 230, 51, 153].

The action 216 may result in a matrix with values as follows:
[[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 76 26 204 76 51 0 0 0 0 178 0 204 0 153 25 26 0 0 0 0 0 0]
[0 0 0 0 0 0 26 204 178 51 153 0 0 0 76 0 51 0 204 0 0 76 0 0 0 0 0 0]
[0 0 0 0 0 25 102 0 26 25 0 76 102 204 178 51 26 25 0 0 0 0 0 0 0 0]
[0 0 0 0 0 0 26 76 128 25 26 76 76 204 26 51 153 25 0 76 178 204 0 0 0 0 0 0]
[0 0 0 0 0 0 51 0 0 0 25 51 76 51 102 0 0 26 76 153 0 51 0 0 0 0 0 0]
[0 0 0 0 0 0 128 25 153 0 26 204 51 51 51 0 0 0 128 204 128 51 0 0 0 0 0 0]
[0 0 0 0 0 0 204 51 0 153 0 26 127 0 0 0 0 76 204 0 0 128 0 0 0 0 0 0]
[0 0 0 0 0 0 76 51 0 0 76 76 0 0 0 0 76 127 153 51 204 25 0 0 0 0 0 0]
[0 0 0 0 0 0 76 128 0 102 0 26 229 0 0 0 76 230 51 230 25 26 0 0 0 0 0 0]
[0 0 0 0 0 0 26 204 153 0 230 25 0 0 0 0 153 229 102 25 26 76 0 0 0 0 0 0]
[0 0 0 0 0 0 25 128 51 26 0 178 0 0 0 230 178 26 25 0 76 26 0 0 0 0 0 0]
[0 0 0 0 0 0 204 76 128 0 178 76 76 229 230 51 0 0 0 76 26 204 0 0 0 0 0 0]
[0 0 0 0 0 0 0 204 76 76 0 25 128 51 26 204 178 76 128 204 26 0 0 0 0 0 0]
[0 0 0 0 0 0 128 25 51 0 76 0 153 0 0 0 76 51 153 204 0 51 0 0 0 0 0 0]
[0 0 0 0 0 0 0 178 0 0 76 51 128 204 76 76 26 25 153 51 128 0 0 0 0 0 0]
[0 0 0 0 0 0 153 51 230 204 0 76 26 25 153 0 178 0 178 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0 0 0]]

The action 218 may then result in the generation of the image 300b.

Therefore, in this second example, the image 300b of FIG. 3B may be generated from the payload data 114b and the time data 116b. Then, in a situation where the server application 110b is a known malicious application, the image 300b may be employed to train the convolutional neural network 122 so that the convolutional neural network 122 can later be employed to recognize other applications that match (e.g., above a certain threshold) the malicious application.

Figure 3C:
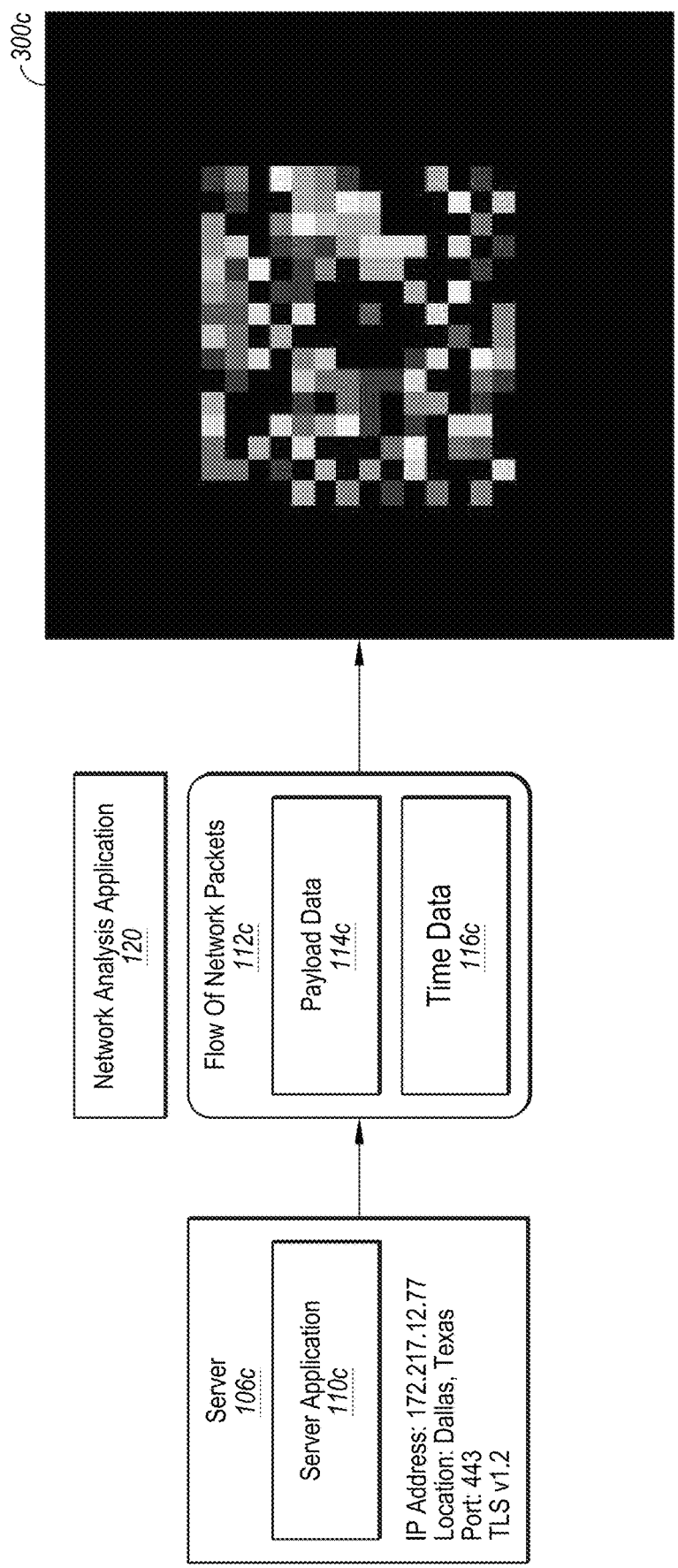
FIG. 3C illustrates a third image generated from payload data and time data from a flow of network packets between a client application and a third server application.

FIG. 3C illustrates a third image 300c generated from the payload data 114c and the time data 116c from the flow of network packets 112c between the client application 108c (see FIG. 1) and the server application 110c. For example, the third image 300c may be generated by the network analysis application 120 executing on the network analysis device 118 from the payload data 114c and the time data 116c from the flow of network packets 112c (e.g., that are intercepted or "sniffed" by the network analysis application 120) that are sent between the client application 108c executing on the client 104c and the server application 110c executing on the server 106c (see FIG. 1). As illustrated in FIG. 3C, the server 106c on which the server application 110c is executing may have an IP address of 172.217.12.77 and may have a location of Dallas, Tex., while the flow of network packets 112c may be communicated over port 443 and be formatted in the encrypted format of TLS v1.2. The generation of the image 300c will now be disclosed in connection with performance of the method 200 of FIG. 2. However, the actions of the method 200, and the code representations of the actions of the method 200 that are disclosed in connection with FIG. 3A, will not be repeated in this disclosure of FIG. 3C, although it is understand that the same code or different code may be employed in the generation of the image 300c.

Prior to the performance of the method 200, the payload data 114c in its raw state may have values as follows: [207, 0, −1370, −1460, −141, 0, 258, 0, 93, 0, 476, 0, 39, 0, −321, −69, 0, 38, 0, −38, −755, −394, 0, 46, 0, 0]. Similarly, the time data 116c in its raw state may have values as follows: [0, 0, −53837, −801, −16, 748, 4898, −54, 3650, −57, 164, −60, 16, −37, −45434, −712, 107, 81, −35, −44870, −17948, −747, 1, 550, −29, 282169].

The action 202 may result in values as follows: [207 0 1370 1460 141 0 258 0 93 0 476 0 39 0 321 69 0 38 0 38 755 394 0 46 0 0].

The action 204 may result in values as follows: [0, 51, 0, 178, 0, 0, 0, 0, 25, 76, 178, 0, 25, 102, 153, 0, 0, 25, 102, 25, 0, 0, 0, 0, 0, 51, 127, 204, 0, 0, 0, 0, 0, 229, 76, 0, 0, 0, 0, 0, 102, 178, 153, 0, 0, 0, 0, 0, 76, 229, 0, 0, 0, 0, 0, 76, 51, 25, 0, 0, 153, 229, 0, 0, 0, 0, 0, 76, 204, 0, 0, 0, 0, 0, 76, 204, 0, 178, 127, 127, 0, 76, 229, 102, 0, 0, 0, 0, 0, 102, 153, 0, 0, 0, 0, 0, 0, 0].

The action 206 may result in values as follows: [0.00000e+00 0.00000e+00 5.38370e+04 8.01000e+02 1.60000e+01 7.48000e+02 4.89800e+03 5.40000e+01 3.65000e+03 5.70000e+01 1.64000e+02 6.00000e+01 1.60000e+01 3.70000e+01 4.54340e+04 7.12000e+02 1.07000e+02 8.10000e+01 3.50000e+01 4.48700e+04 1.79480e+04 7.47000e+02 1.00000e+00 5.50000e+02 2.90000e+01 2.82169e+05].

The action 208 may result in values as follows: [0. 0. 15.7163104 9.64565843 4. 9.54689446 12.25797706 5.7548875 11.83368075 5.83289001 7.357552 5.9068906 4. 5.20945337 15.47148471 9.47573343 6.74146699 6.33985 5.12928302 15.45346356 14.13153547 9.54496443 0. 9.10328781 4.857981 18.10619997].

The action 210 may result in values as follows: [0. 0. 1267.29038775 777.78116519 322.54145039 769.81729645 988.42642483 464.04744044 954.21313803 470.33720128 593.27887372 476.304265 322.54145039 420.06616107 1247.54877912 764.07920108 543.60063489 511.2161038 413.60159594 1246.09563784 1139.50148658 769.66166802 0. 734.04691326 391.72505903 1460].

The action 212 may result in values as follows: [0, 0, 0, 0, 0, 0, 0, 0, 26, 51, 153, 178, 0, 178, 178, 0, 76, 51, 51, 0, 178, 153, 230, 0, 230, 204, 204, 0, 102, 153, 102, 0, 230, 128, 102, 0, 102, 178, 0, 0, 128, 230, 76, 0, 102, 178, 153, 0, 76, 51, 51, 0, 102, 0, 26, 51, 102, 178, 0, 178, 153, 102, 0, 128, 102, 76, 0, 128, 26, 26, 0, 102, 26, 76, 26, 51, 102, 153, 26, 26, 76, 230, 0, 178, 153, 230, 0, 0, 0, 0, 0, 178, 76, 102, 0, 76, 230, 26, 26, 102, 153, 0].

The action 214 may result in values as follows: [0, 0, 51, 0, 0, 0, 178, 0, 0, 0, 0, 0, 0, 0, 0, 25, 26, 76, 51, 178, 153, 0, 178, 25, 0, 102, 178, 153, 178, 0, 178, 0, 0, 25, 76, 102, 51, 25, 51, 0, 0, 0, 178, 0, 153, 0, 230, 0, 0, 51, 230, 127, 204, 204, 204, 0, 0, 0, 102, 0, 153, 0, 102, 0, 0, 0, 230, 229, 128, 76, 102, 0, 0, 0, 102, 0, 178, 0, 0, 0, 0, 102, 128, 178, 230, 153, 76, 0, 0, 0, 102, 0, 178, 0, 153, 0, 0, 0, 76, 76, 51, 229, 51, 0, 0, 0, 102, 0, 51, 0, 0, 0, 26, 76, 51, 51, 102, 25, 178, 0, 0, 0, 178, 153, 153, 229, 102, 0, 0, 0, 128, 0, 102, 0, 76, 0, 0, 0, 128, 76, 26, 204, 26, 0, 0, 0, 102, 0, 26, 0, 76, 0, 26, 0, 51, 76, 102, 204, 153, 0, 26, 178, 26, 127, 76, 127, 230, 0, 0, 76, 178, 229, 153, 102, 230, 0, 0, 0, 0, 0, 0, 0, 0, 0, 178, 102, 76, 153, 102, 0, 0, 0, 76, 0, 230, 0, 26, 0, 26, 0, 102, 0, 153, 0, 0].

The action 216 may result in a matrix with values as follows:
[[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 76 102 204 153 0 26 178 26 127 76 127 230 0 0 0 0 0 0 0 0]
[0 0 0 0 0 0 51 0 0 0 26 76 51 51 102 25 178 0 0 76 0 0 0 0 0 0]
[0 0 0 0 0 0 0 51 0 0 0102 0178 0 0 0 0 0178 0 0 0 0 0 0 0]
[0 0 0 0 0 0 26 0 102 0 178 0 153 0 230 0 0 102 178 229 0 0 0 0 0 0]
[0 0 0 0 0 0 153 0 102 76 0 178 153 0 178 25 0 51 128 153 153 0 0 0 0 0]
[0 0 0 0 0 0 76 0 128 0 51 178 0 0 0 102 230 178 153 102 0 0 0 0 0 0]
[0 0 0 0 0 0 102 0 0 229 51 76 0 0 0 0 178 127 230 229 230 0 0 0 0 0]
[0 0 0 0 0 0 26 0 230 25 26 0 0 51 0 153 204 153 102 0 0 0 0 0 0 0]
[0 0 0 0 0 0 26 0 51 0 51 25 0 0 0 0 178 204 76 0 0 0 0 0 0 0]
[0 0 0 0 0 0 0 102 229 0 102 76 25 0 0 178 0 204 0 0 0 0 0 0 0 0]
[0 0 0 0 0 0 26 0 51 0 102 0 153 0 102 0 0 0 0 0 0 0 0 0 0 0]
[0 0 0 0 0 0 0 76 76 0 0 0 153 0 178 0 102 0 128 0 0 0 0 0 0 0]
[0 0 0 0 0 0 230 0 26 204 26 76 128 0 0 0 76 0 102 0 0 0 0 0 0 0]
[0 0 0 0 0 0 76 0 0 0 102 153 76 102 178 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]
[0 0 0 0 0 0 0 0 0 0 0 0 0 0 0 0 0 0 0 0 0 0 0 0 0 0]]]

The action 218 may then result in the generation of the image 300c.

Therefore, in this third example, the image 300c of FIG. 3C may be generated from the payload data 114c and the time data 116c. Then, in a situation where the server application 110c is a known malicious application, the image 300c may be employed to train the convolutional neural network 122 so that the convolutional neural network 122 can later be employed to recognize other applications that match (e.g., above a certain threshold) the malicious application.

Although the images 300a-300c are illustrated in FIGS. 3A-3C as lossless grayscale images, it is understood that the images 300a-300c may instead be color images and/or lossy images, which may require modifications to some of the actions of the method 200, particularly the normalization actions, in order to properly generate the images.

Figure 4:
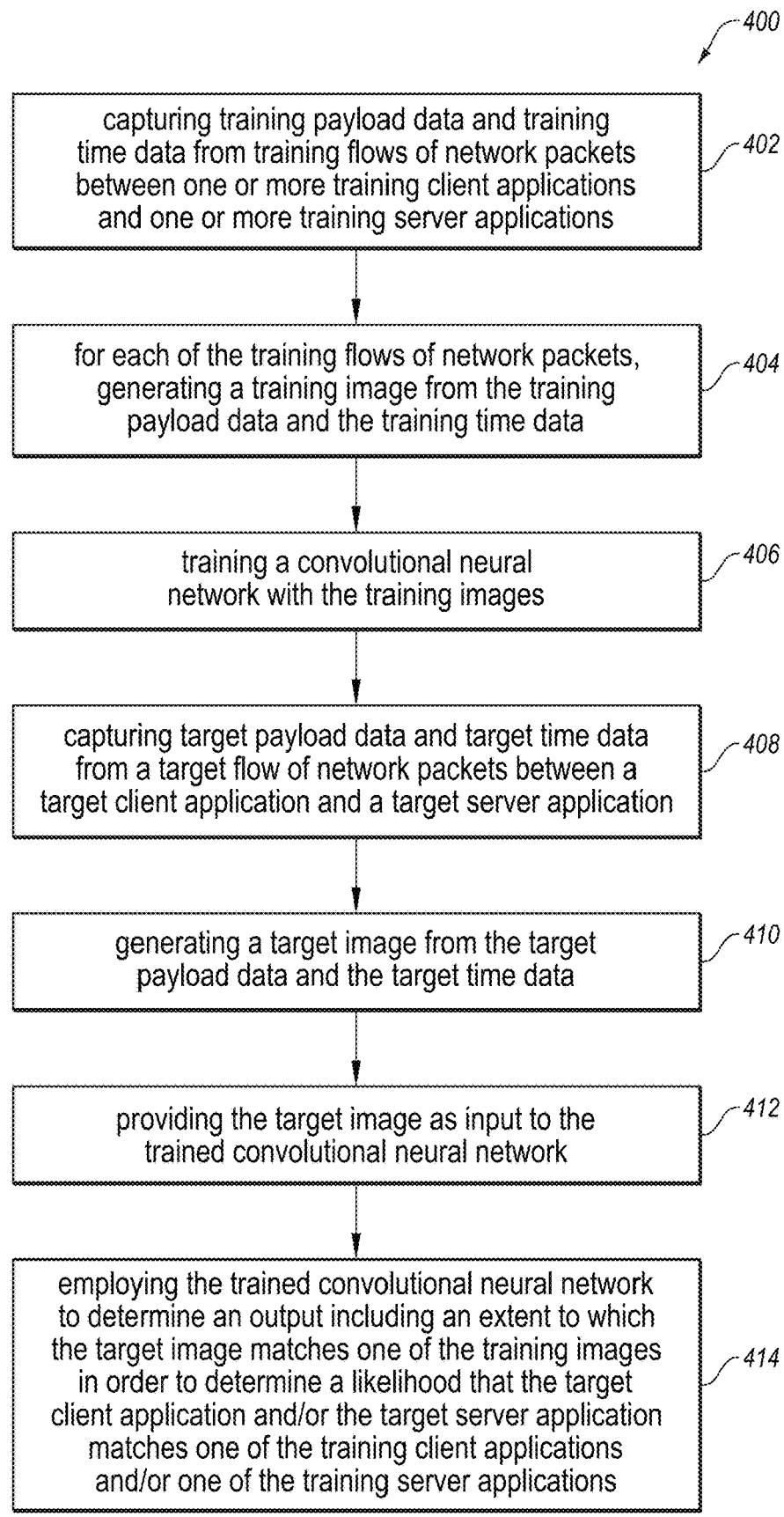
FIG. 4 is a flowchart of an example method for identifying network applications using images generated from payload data and time data.

FIG. 4 is a flowchart of an example method 400 for identifying network applications using images generated from payload data and time data. The method 400 may be performed, in some embodiments, by a device or application, such as by the network analysis application 120 executing on the network analysis device 118 of FIG. 1. In these and other embodiments, the method 400 may be performed by one or more processors based on one or more computer-readable instructions stored on one or more non-transitory computer-readable media. The method 400 will now be described in connection with FIGS. 1, 2, 3A-3C, and 4.

The method 400 may include, at action 402, capturing training payload data and training time data from training flows of network packets between one or more training client application and one or more training server applications. In some embodiments, the target payload data may indicate lengths of payloads of the network packets in the training flow. In some embodiments, the target time data may indicate time periods between arrivals of the network packets in the training flow. For example, the network analysis application 120 may capture, at action 402, training payload data (e.g., payload data 114a-114c) and training time data (e.g., time data 116a-116c) from training flows of network packets (e.g., flows of network packets 112a-112c) between one or more training client applications (e.g., client applications 108a-108c) and one or more training server applications (e.g., server application 110a-110c).

The method 400 may include, at action 404, for each of the training flows of network packets, generating a training image from the training payload data and the training time data. For example, the network analysis application 120 may, for each of the training flows of network packets (e.g., flows of network packets 112a-112c), generate, at action 404, the training images (e.g., the images 300a-300c) from the training payload data (e.g., payload data 114a-114c) and the training time data (e.g., time data 116a-116c), and may store the training images in the training image database 124. This generation of each of these training images may be performed according to one or more actions of the method 200.

The method 400 may include, at action 406, training a convolutional neural network with the training images. For example, the network analysis application 120 may train, at action 406, the convolutional neural network 122 with the training images (e.g., the training images 300a-300c) stored in the training image database 124. This training may include labeling the training images so that when a match is later identified with one of the training images, various known characteristics about the training image can be disclosed (e.g., the known name or nature of the application associated with the training image).

The method 400 may include, at action 408, capturing target payload data and target time data from a target flow of network packets between a target client application and a target server application. In some embodiments, the target payload data may indicate lengths of payloads of the network packets in the target flow. In some embodiments, the target time data may indicate time periods between arrivals of the network packets in the target flow. For example, the network analysis application 120 may capture, at action 408, target payload data (e.g., the payload data 114n) and target time data (e.g., the time data 116n) from a target flow of network packets (e.g., the flow of network packets 112n) between a target client application (e.g., the client application 108n) and a target server application (e.g., the server application 110n).

The method 400 may include, at action 410, generating a target image from the target payload data and the target time data. For example, the network analysis application 120 may generate, at action 410, a target image from the target payload data (e.g., the payload data 114n) and the target time data (e.g., the time data 116n). This generation of this target image may be performed according to one or more actions of the method 200.

The method 400 may include, at action 412, providing the target image as input to the trained convolutional neural network. For example, the network analysis application 120 may provide, at action 412, the target image as input to the trained convolutional neural network 120.

The method 400 may include, at action 414, employing the trained convolutional neural network to determine an output including an extent to which the target image matches one of the training images in order to determine a likelihood that the target client application and/or the target server application matches one of the training client applications and/or one of the training server applications. For example, the network analysis application 120 may employ, at action 414, the trained convolutional neural network 120 to determine an output including an extent to which the target image matches one of the training images (e.g., the training images 300a-300c) in order to determine a likelihood that the target client application (e.g., the client application 108n) and/or the target server application (e.g., the server application 1110n) matches one of the training client applications (e.g., the client applications 108a-108c) and/or one of the training server applications (e.g., the server applications 110a-110c).

In some embodiments, at least one of the training client applications and the training server applications is a malicious application. In these embodiments, the method 400 may further include determining that the likelihood that the target client application and/or the target server application matches the malicious application is above a threshold match value (e.g., above 90%), and in response, performing a remedial action. In these embodiments, the remedial action may include blocking one or more computing devices from executing the target client application and/or the target server application, blocking the one or more computing devices from communicating with the target client application and/or the target server application over a network, or alerting a user that the target client application and/or the target server application is likely a malicious application, or some combination thereof. For example, where at least one of the training client applications (e.g., client applications 108a-108c) and the training server applications (e.g., server application 110a-110c) is a known malicious application, the convolutional neural network 120 may have been trained to recognize the same or similar malicious application (e.g., a similar application may be slightly different, but a match above a threshold, such as 90%, may nevertheless identify the similar application as matching above a threshold, which may indicate that the malware is at least in the same malware family). As such, the network analysis application 120 may determine that the likelihood that the client application 108n and/or the server application 110n matches the malicious application is above a threshold match value (e.g., above a 90% match, or some other higher or lower threshold, as output by the convolutional neural network 120). In response, the network analysis application 120 may determine that the target application is a malicious application, and may perform a remedial action such as blocking the client 104n or the server 106n from executing the malicious application, blocking the client 104n or the server 106n from communicating with the malicious application over the network 102, or alerting a system administrator that the malicious application is likely a malicious application.

In some embodiments, the method 400 may enable the network analysis application 120 to identify the client application 108n and/or the server application 110n based on the payload data 114n and the time data 116n of the flow of network packets 112n between the client 104n and the server 106n, without employing conventional DPI. By not relying on the use of conventional DPI, the method 400 may enable the network analysis application 120 to identify the client application 108n and/or the server application 110n without the burden in terms of time and resources consumed by DPI. Further, by not relying on the use of conventional DPI, the method 400 may enable the network analysis application 120 to identify the client application 108n and/or the server application 110n even where the payloads of the network packets in the flow of network packets 112n between the client 104n and the server 106n are encrypted (e.g., using TLS v1.3, for example), because the payload data 114n and the time data 116n for the flow of network packets 112n is available even where the payloads of the network packets in the flow of network packets 112n are encrypted. Accordingly, the method 400 may be superior, at least in some respects, to conventional DPI and may result in accurate identification of the client application 108n and/or the server application 110n in some circumstances (e.g., where payloads are encrypted) where conventional DPI may fail entirely.

Although the actions of the method 400 are illustrated in FIG. 4 as discrete actions, various actions may be divided into additional actions, combined into fewer actions, reordered, expanded, or eliminated, depending on the desired implementation. For example, in some embodiments, the action 410 may be performed without performing the other actions of the method 400. Also, in some embodiments, the actions 410-114 may be performed without performing the other actions of the method 400. Further, in some embodiments, the actions 408-114 may be performed without performing the other actions of the method 400. Also, in some embodiments, the actions 404 and 406 may be performed without performing the other actions of the method 400. Further, in some embodiments, the actions 402-406 may be performed without performing the other actions of the method 400.

Further, it is understood that the method 400 may improve the functioning of a network device itself, and/or may improve the technical field of malicious application detection and remediation. For example, the functioning of the client 104n, the server 104c, and/or the network analysis device 118 of FIG. 1 may itself be improved by the method 400, by enabling the network analysis application 120 to identify the client application 108n and/or the server application 110n as a malicious application based on the payload data 114n and the time data 116n of the flow of network packets 112n between the client 104n and the server 106n, without employing conventional DPI, and even where the payloads of the network packets are encrypted (e.g., using TLS v1.2 or v1.3). Once a malicious application is identified, the method 400 may enable the network analysis application 120 to perform a remedial action to protect one or more network devices or one or more networks from the malicious application.

FIG. 5 illustrates an example computer system 500 that may be employed in identifying network applications using images generated from payload data and time data. In some embodiments, the computer system 500 may be part of any of the systems or devices described in this disclosure. For example, the computer system 500 may be part of any of the clients 104a-104n, the servers 106a-106n, and the network analysis device 118 of FIG. 1.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 502 may include any suitable special-purpose or general-purpose computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more actions of the method 200 of FIG. 2 or of the method 400 of FIG. 4.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more actions of the method 200 of FIG. 2 or of the method 400 of FIG. 4. These computer-executable instructions may be included, for example, in the operating system 510, in one or more applications, such as the application 514, or in some combination thereof.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more actions of the method 200 of FIG. 2 or of the method 400 of FIG. 4. In some embodiments, the application 514 may be part of the operating system 510 or may be part of an application of the computer system 500, or may be some combination thereof. In some embodiments, the application 514 may function as one of the client applications 108a-108n, the server application 110a-110n, and the network analysis application 120 of FIG. 1.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 502 of FIG. 5) including various computer hardware or software applications, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying network applications using images generated from payload data and time data, at least a portion of the computer-implemented method being performed by a computing device comprising one or more processors, the computer-implemented method comprising:
    training a convolutional neural network with training images generated from training payload data and training time data from flows of network packets between one or more training client applications and one or more training server applications;
    capturing target payload data and target time data from a target flow of network packets between a target client application and a target server application, the target payload data indicating lengths of payloads of the network packets in the target flow, the target time data indicating time periods between arrivals of the network packets in the target flow;
    generating a target image from the target payload data and the target time data by:
        normalizing the target payload data,
        normalizing the target time data,
        combining the normalized target payload data with the normalized target time data into a set of combined data points,
        placing the set of combined data points in a matrix beginning at a center of the matrix and spiraling outward from the center of the matrix, and
        converting the matrix into the target image by converting each data point in the matrix into a pixel of the target image;
    providing the target image as input to the trained convolutional neural network; and
    employing the trained convolutional neural network to determine an output including an extent to which the target image matches one of the training images in order to determine a likelihood that the target client application and/or the target server application matches one of the one or more training client applications and/or one of the one or more training server applications.

2. The computer-implemented method of claim 1, wherein:
    one of the one or more training client applications and the one or more training server applications is a malicious application;
    the computer-implemented method further comprises determining that the likelihood that the target client application and/or the target server application matches the malicious application is above a threshold match value; and
    the computer-implemented method further comprises, in response to determining that the likelihood that the target client application and/or the target server application matches the malicious application is above the threshold match value, performing a remedial action.

3. The computer-implemented method of claim 2, wherein the performing of the remedial action comprises:
    blocking one or more computing devices from executing the target client application and/or the target server application;
    blocking the one or more computing devices from communicating with the target client application and/or the target server application over a network; or
    alerting a user that the target client application and/or the target server application is likely the malicious application;
    or some combination thereof.

4. The computer-implemented method of claim 1, wherein the target image comprises a grayscale image.

5. The computer-implemented method of claim 1, wherein the normalizing of the target payload data comprises:
    converting the lengths of the payloads of the network packets in the target flow to positive Int32 length values;
    padding each of the positive Int32 length values to four digits;
    splitting each of the four digits into single-digit integers; and
    multiplying each of the single-digit integers by 28.3.

6. The computer-implemented method of claim 5, wherein the normalizing of the target time data comprises:
    converting the time periods between the arrivals of the network packets in the target flow to positive Float64 time period values;
    applying a Log Base 2 transformation to each of the positive Float64 time period values to generate first normalized time period values;
    normalizing the first normalized time period values to generate second normalized time period values between 0 and 999;
    padding each of the second normalized time period values to four digits;
    splitting each of the four digits into single-digit integers; and
    multiplying each of the single-digit integers by 28.3.

7. The computer-implemented method of claim 1, wherein the combining of the normalized target payload data with the normalized target time data into the set of combined data points comprises interleaving the normalized target payload data and the normalized target time data into an array of the set of combined data points.

8. The computer-implemented method of claim 1, wherein the placing of the set of combined data points in the matrix comprises placing the set of combined data points in the matrix beginning at the center of the matrix and spiraling outward in a clockwise direction from the center of the matrix.

9. The computer-implemented method of claim 1, wherein the placing of the set of combined data points in the matrix comprises padding any remainder of the matrix with zeros.

10. A computer-implemented method for identifying network applications using images generated from payload data and time data, at least a portion of the computer-implemented method being performed by a computing device comprising one or more processors, the computer-implemented method comprising:
    capturing training payload data and training time data from training flows of network packets between one or more training client application and one or more training server applications, the training payload data indicating lengths of payloads of the network packets in each training flow, the training time data indicating time periods between arrivals of the network packets in each training flow;
    for each of the training flows of network packets, generating a training image from the training payload data and the training time data by:
      normalizing the training payload data;
      normalizing the training time data;
      combining the normalized training payload data with the normalized training time data into a set of combined training data points;
      placing the set of combined training data points in a training matrix beginning at a center of the training matrix and spiraling outward from the center of the training matrix; and
      converting the training matrix into the training image by converting each data point in the training matrix into a pixel of the training image;
    training a convolutional neural network with the training images;
    capturing target payload data and target time data from a target flow of network packets between a target client application and a target server application, the target payload data indicating lengths of payloads of the network packets in the target flow, the target time data indicating time periods between arrivals of the network packets in the target flow;
    generating a target image from the target payload data and the target time data by:
      normalizing the target payload data,
      normalizing the target time data,
      combining the normalized target payload data with the normalized target time data into a set of combined target data points,
      placing the set of target combined data points in a target matrix beginning at a center of the target matrix and spiraling outward from the center of the target matrix, and
      converting the target matrix into the target image by converting each data point in the target matrix into a pixel of the target image;
    providing the target image as input to the trained convolutional neural network; and
    employing the trained convolutional neural network to determine an output including an extent to which the target image matches one of the training images in order to determine a likelihood that the target client application and/or the target server application matches one of the one or more training client applications and/or one of the one or more training server applications.

11. The computer-implemented method of claim 10, wherein:
    one of the one or more training client applications and the one or more training server applications is a malicious application;
    the computer-implemented method further comprises determining that the likelihood that the target client application and/or the target server application matches the malicious application is above a threshold match value; and
    the computer-implemented method further comprises, in response to determining that the likelihood that the target client application and/or the target server application matches the malicious application is above the threshold match value, performing a remedial action.

12. The computer-implemented method of claim 11, wherein the performing of the remedial action comprises:
    blocking one or more computing devices from executing the target client application and/or the target server application;
    blocking the one or more computing devices from communicating with the target client application and/or the target server application over a network; or
    alerting a user that the target client application and/or the target server application is likely the malicious application;
    or some combination thereof.

13. The computer-implemented method of claim 10, wherein the normalizing of the target payload data comprises:
    converting the lengths of the payloads of the network packets in the target flow to positive Int32 length values;
    padding each of the positive Int32 length values to four digits;
    splitting each of the four digits into single-digit integers; and
    multiplying each of the single-digit integers by 28.3.

14. The computer-implemented method of claim 13, wherein the normalizing of the target time data comprises:
    converting the time periods between the arrivals of the network packets in the target flow to positive Float64 time period values;
    applying a Log Base 2 transformation to each of the positive Float64 time period values to generate first normalized time period values;
    normalizing the first normalized time period values to generate second normalized time period values between 0 and 999;
    padding each of the second normalized time period values to four digits;
    splitting each of the four digits into single-digit integers; and
    multiplying each of the single-digit integers by 28.3.

15. The computer-implemented method of claim 10, wherein the combining of the normalized target payload data with the normalized target time data into the set of combined target data points comprises interleaving the normalized target payload data and the normalized target time data into an array of the set of combined target data points.

16. The computer-implemented method of claim 10, wherein the placing of the set of combined target data points in the target matrix comprises placing the set of combined target data points in the target matrix beginning at the center of the target matrix and spiraling outward in a clockwise direction from the center of the target matrix.

17. The computer-implemented method of claim 10, wherein the placing of the set of combined target data points in the target matrix comprises padding any remainder of the target matrix with zeros.

18. A computer-implemented method for identifying network applications using images generated from payload data and time data, at least a portion of the computer-implemented method being performed by a computing device comprising one or more processors, the computer-implemented method comprising:
   (a) capturing training payload data and training time data from training flows of network packets between one or more malicious client application and one or more malicious server applications, the training payload data indicating lengths of payloads of the network packets in each training flow, the training time data indicating time periods between arrivals of the network packets in each training flow;
   (b) for each of the training flows of network packets, generating a training image from the training payload data and the training time data by:
   (c) normalizing the payload data,
   (d) normalizing the time data,
   (e) combining the normalized payload data with the normalized time data into a set of combined data points,
   (f) placing the set of combined data points in a matrix beginning at a center of the matrix and spiraling outward from the center of the matrix, and
   (g) converting the matrix into the image by converting each data point in the matrix into a pixel of the image;
   (h) training a convolutional neural network with the training images;
   (i) capturing target payload data and target time data from a target flow of network packets between a target client application and a target server application, the target payload data indicating lengths of payloads of the network packets in the target flow, the target time data indicating time periods between arrivals of the network packets in the target flow;
   (j) generating a target image from the target payload data and the target time data by performing (c)-(g) on the target payload data and the target time data;
   (k) providing the target image as input to the trained convolutional neural network;
   (l) employing the trained convolutional neural network to determine an output including an extent to which the target image matches one of the training images in order to determine a likelihood that the target client application and/or the target server application matches one of the one or more malicious client applications and/or one of the one or more malicious server applications;
   (m) determining that the likelihood that the target client application and/or the target server application matches one of the one or more malicious client applications and/or one of the one or more malicious server applications is above a threshold match value; and
   (n) in response to determining that the likelihood is above the threshold match value, performing a remedial action comprising:
   blocking one or more computing devices from executing the target client application and/or the target server application;
   blocking the one or more computing devices from communicating with the target client application and/or the target server application over a network; or
   alerting a user that the target client application or the target server application is likely a malicious application;
   or some combination thereof.

* * * * *